(12) United States Patent
Yoshida (10) Patent No.: US 7,751,310 B2
(45) Date of Patent: Jul. 6, 2010

(54) FAULT TOLERANT DUPLEX COMPUTER SYSTEM AND ITS CONTROL METHOD

(75) Inventor: Masahiro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1232 days.

(21) Appl. No.: 11/312,116

(22) Filed: Dec. 20, 2005

(65) Prior Publication Data

US 2006/0133410 A1 Jun. 22, 2006

(30) Foreign Application Priority Data

Dec. 20, 2004 (JP) ............................. 2004-367748

(51) Int. Cl.
*G01R 31/08* (2006.01)
*G06F 11/00* (2006.01)
*H04J 3/06* (2006.01)
*G06F 15/173* (2006.01)

(52) U.S. Cl. ..................... 370/217; 370/242; 370/503; 709/224

(58) Field of Classification Search ......... 370/217–220, 370/241, 241.1, 242, 250, 252, 253; 709/223–224; 714/11

See application file for complete search history.

(56) References Cited

U.S. PATENT DOCUMENTS

| | | | | |
|---|---|---|---|---|
| 4,817,091 A | * | 3/1989 | Katzman et al. ................ | 714/8 |
| 5,704,031 A | * | 12/1997 | Mikami et al. .................. | 714/4 |
| 5,796,934 A | * | 8/1998 | Bhanot et al. ................... | 714/4 |
| 6,038,288 A | * | 3/2000 | Thomas et al. ............ | 379/15.01 |
| 6,092,213 A | * | 7/2000 | Lennie et al. ................... | 714/3 |
| 6,542,962 B2 | * | 4/2003 | Kodama et al. ............. | 711/114 |
| 6,594,786 B1 | * | 7/2003 | Connelly et al. .............. | 714/50 |
| 6,708,287 B1 | * | 3/2004 | Mitsuhashi et al. ........... | 714/15 |
| 6,785,838 B2 | * | 8/2004 | Lim et al. ....................... | 714/7 |
| 6,854,072 B1 | * | 2/2005 | Cagle et al. .................... | 714/15 |
| 6,862,688 B2 | * | 3/2005 | Ochiai ............................ | 714/2 |
| 6,931,568 B2 | * | 8/2005 | Abbondanzio et al. ......... | 714/11 |
| 7,032,128 B2 | * | 4/2006 | Nakano ........................ | 714/11 |

(Continued)

FOREIGN PATENT DOCUMENTS

JP 03-273344 12/1991

(Continued)

*Primary Examiner*—Chi H Pham
*Assistant Examiner*—Warner Wong
(74) *Attorney, Agent, or Firm*—Scully, Scott, Murphy & Presser, P.C.

(57) ABSTRACT

There is disclosed a fault tolerant duplex computer system capable of increasing accuracy of processing to be continued by collecting trouble information without stopping duplex running. CPU's (112, 122), memories (113, 123), and IO processors (114, 124) of systems (110, 120) announce a reparable trouble to fault diagnosis processors (116, 126) when the generated trouble can be repaired, and an irreparable trouble when the generated trouble cannot be repaired. When an out-of-sync situation is confirmed, the out-of-sync situation is announced. A fault monitoring section (130) updates reparable trouble information (131) of a relevant system when the reparable trouble is received, and irreparable trouble information (132) of a relevant system when the irreparable trouble is received. Upon reception of the out-of-sync situation, a synchronous processing instruction is made by setting the system of a smaller amount of trouble information as an active system and the system of a larger number of trouble information as a standby system.

6 Claims, 6 Drawing Sheets

U.S. PATENT DOCUMENTS

| | | | |
|---|---|---|---|
| 7,275,100 B2 * | 9/2007 | Yamagami | 709/224 |
| 7,380,001 B2 * | 5/2008 | Masuyama et al. | 709/226 |
| 7,409,577 B2 * | 8/2008 | Wing et al. | 714/4 |
| 7,478,274 B2 * | 1/2009 | Nishida et al. | 714/11 |
| 2004/0001449 A1 * | 1/2004 | Rostron et al. | 370/282 |
| 2004/0078455 A1 * | 4/2004 | Eide et al. | 709/223 |
| 2005/0262242 A1 * | 11/2005 | Byers et al. | 709/225 |

FOREIGN PATENT DOCUMENTS

| | | |
|---|---|---|
| JP | 06-152570 | 5/1994 |
| JP | 06-266574 | 9/1994 |
| JP | 08-235015 | 9/1996 |
| JP | 08-263329 | 10/1996 |
| JP | 09-146853 | 6/1997 |
| JP | 2002-259154 | 9/2002 |

* cited by examiner

FAULT TOLERANT DUPLEX COMPUTER SYSTEM AND ITS CONTROL METHOD

BACKGROUND OF THE INVENTION

1. Field of the Invention

The present invention relates to a fault tolerant duplex computer system in which two systems perform duplex running in synchronization while monitoring mutual operation situations.

2. Description of the Related Art

Regarding a system that has a duplexed processor, there has conventionally been available a computer system which temporarily stops a duplex operation when a trouble occurs and continues an operation of a processor considered to be normal in accordance with a situation of the trouble (e.g., see JP-H06-266574A).

To suppress interruption of this processing, an operation of the duplex system is continued without implementing collection of information on a trouble to be repaired.

Conventionally, however, the duplex running is temporarily stopped to collect information on a trouble to be repaired, causing a problem of interruption of the processing.

And the information on a trouble to be repaired is not collected to suppress interruption of the processing, causing a problem of decrease of determination accuracy of the active or standby system.

SUMMARY OF THE INVENTION

It is therefore an object of the present invention to provide a fault tolerant duplex computer system capable of increasing accuracy of processing to be continued by collecting trouble information without stopping duplex running even in the case of a trouble to be repaired, and using the collected trouble information as a determination material of an active or standby system when an out-of-sync situation occurs to enhance determination accuracy, and its control method.

To solve the above problems, the present invention has been developed. The present invention is characterized by a fault tolerant duplex computer system in which two systems perform duplex running in synchronization while monitoring mutual operation situations, comprising a data processing section which causes each system to repair and announce a trouble generated in a process of transferring data or executing an arithmetic operation therein; a fault diagnosis processor which announces information of the trouble generated in the system and executes processing instructed to the system; and a fault monitoring section which classifies pieces of trouble information received from the systems to record them as reparable trouble information or irreparable trouble information, and instructs trouble repairing processing to the systems based on the information, wherein the fault monitoring section updates the reparable trouble information of a relevant system when a reparable trouble is received from each system; updates the irreparable trouble information of a relevant system to instruct a diagnosis of the system when an irreparable trouble is received; and compares the pieces of trouble information from the systems with each other when an out-of-sync situation is received, to instruct synchronous processing by setting the system including a smaller amount of the trouble information as an active system and the system including a larger amount of the trouble information as a standby system.

According to this configuration, the repairable trouble information and the irreparable trouble information can be recorded corresponding to each system while executing the duplex running, and the recorded trouble information can be used as determination materials of the active or standby system when the out-of-sync situation occurs.

A first effect of the present invention is that accuracy of processing to be continued can be increased by enhancing determination accuracy of the active or standby system. It is because even in the case of the repairable trouble, the trouble information is collected, and the collected trouble information is used as the determination material of the active or standby system even when the out-of-sync situation occurs.

A second effect of the present invention is that interruption of processing when the out-of-sync situation occurs can be limited to a minimum. It is because the trouble information can be collected without stopping the duplex running.

DESCRIPTION OF THE PREFERRED EMBODIMENTS

Next, the preferred embodiments of the present invention will be described with reference to the accompanying drawings.

Figure 1:
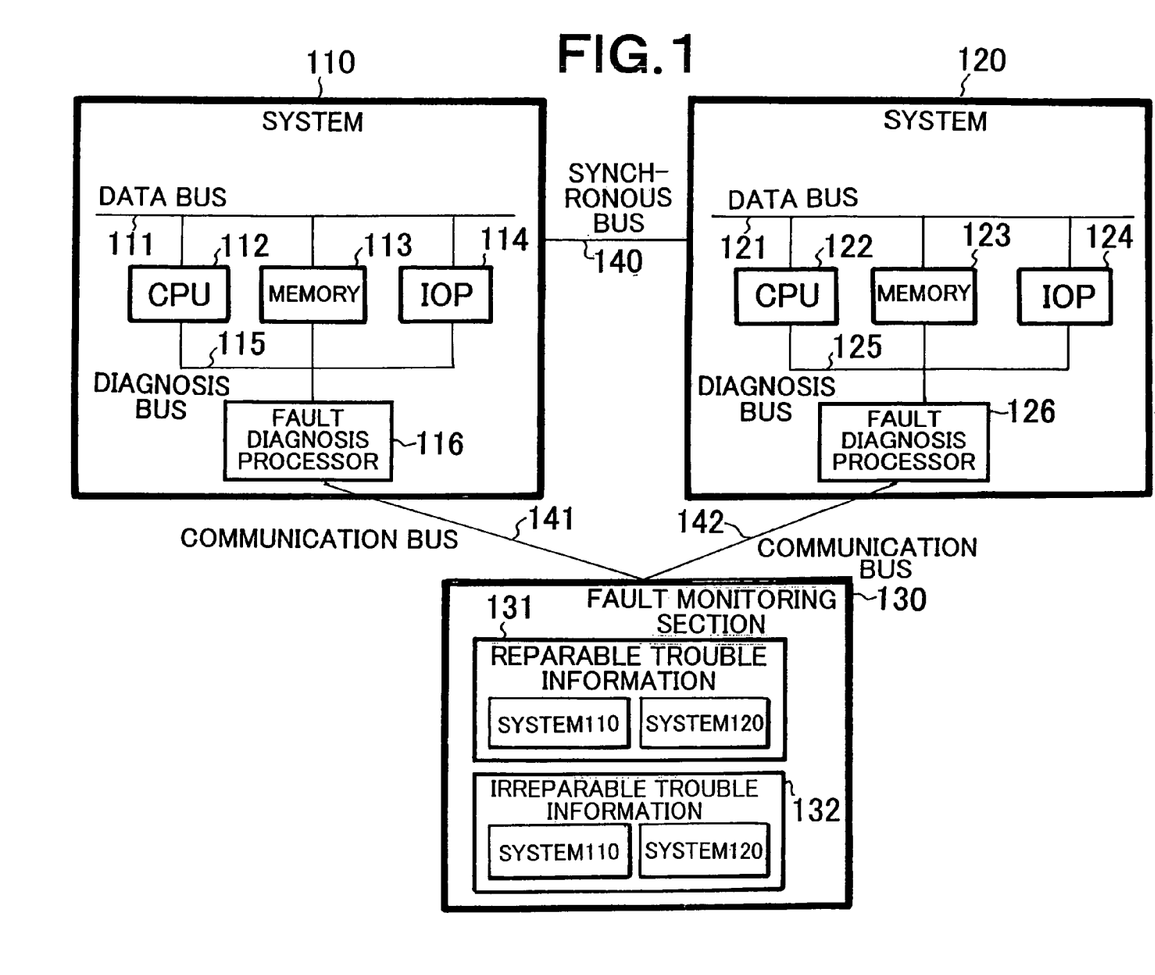
FIG. 1 is a block diagram showing a first embodiment of the present invention.

FIG. 1 is a block diagram showing a first embodiment of the present invention. Systems 110, 120 are engaged in synchronous duplex running while monitoring mutual operation situations via a synchronous bus 140. The systems 110, 120 are configured by respectively including CPU's 112, 122, memories 113, 123, IO processors 114, 124, and fault diagnosis processors 116, 126 as data processing units.

The CPU's 112, 122, the memories 113, 123, and the IO processors 114, 124 transfer data through data buses 111, 121 to realize arithmetic operations. The CPU's 112, 122, the memories 113, 123, and the IO processors 114, 124 determine whether a trouble can be repaired or not based on additional data such as an error correction code (ECC) when the trouble occurs in the process of the data transfer or the arithmetic operation, announce reparability of the trouble through diagnosis buses 115, 125 to the fault diagnosis processors 116, 126 when the trouble can be repaired, and repair the trouble to continue processing thereafter.

When the generated trouble cannot be repaired, the irreparable trouble is announced through the diagnosis buses 115, 125 to the fault diagnosis processors 116, 126, processing thereafter is stopped, and the process waits for instructions from the fault diagnosis processors 116, 126. When an out-of-sync situation is confirmed on the synchronous bus 140, the CPU's 112, 122, the memories 113, 123, and the IO processors 114, 124 announce the out-of-sync situation through the diagnosis buses 115, 125 to the fault diagnosis processors 116, 126.

A fault monitoring section 130 classifies pieces of trouble information received from the systems 110 and 120, and records the pieces as reparable trouble information 131 and irreparable trouble information 132 corresponding to the systems.

Figure 2:
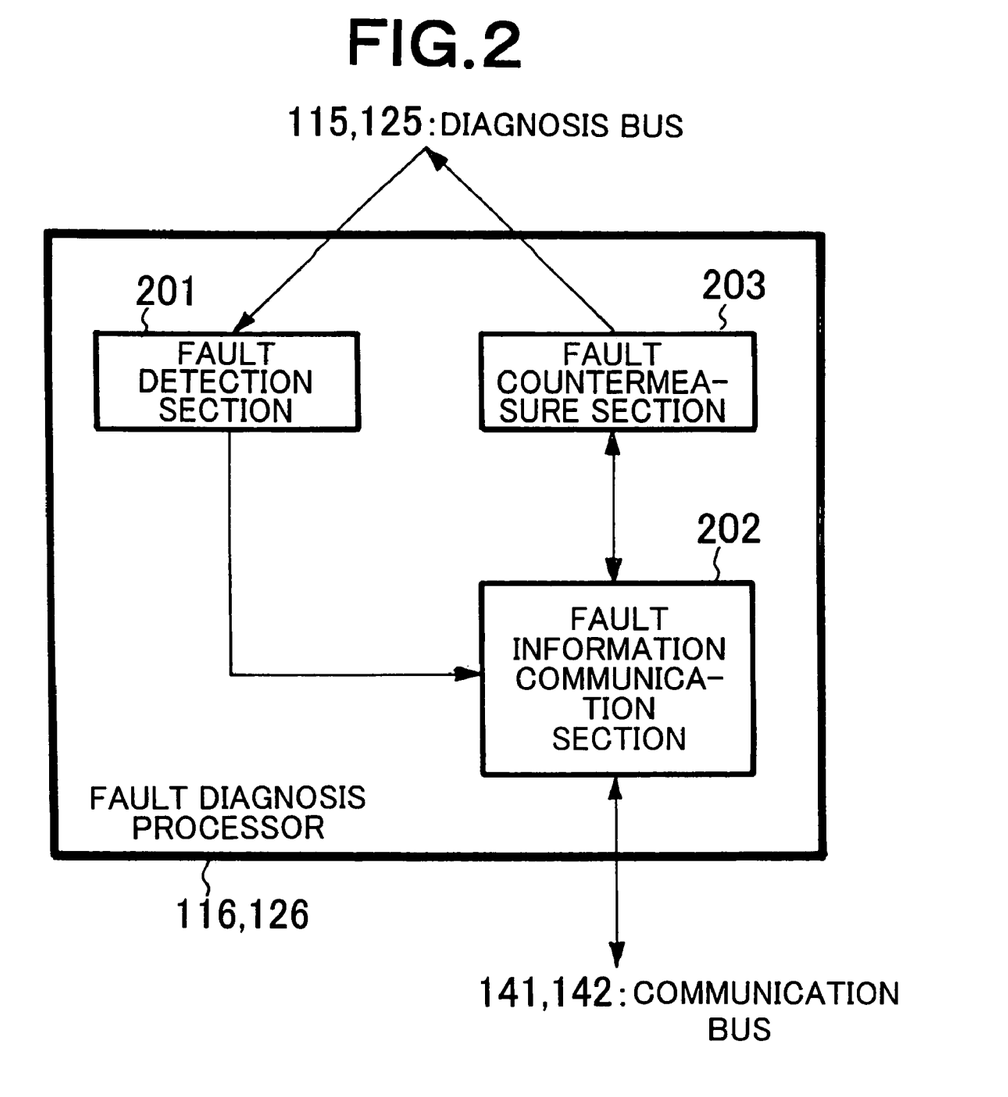
FIG. 2 is an internal block diagram of a fault diagnosis processor.

FIG. 2 shows an internal configuration of the fault diagnosis processor. The fault diagnosis processors 116, 126 receive the reparable trouble, the irreparable trouble, and the out-of-sync situation from the CPU's 112, 122, the memories 113, 123, and the IO processors 114, 124 through the diagnosis buses 115, 125 by a fault detection section 201.

A fault information communication section 202 makes an inquiry about an announcement alone in the case of the reparable trouble, and an announcement and processing contents thereafter in the case of the irreparable trouble and the out-of-sync situation through communication buses 141, 142 to the fault monitoring section 130, and announces a result of the inquiry to a fault countermeasure section 203.

The fault countermeasure section 203 instructs processing after the occurrence of the irreparable trouble and the out-of-sync situation of the systems 110, 120 to the CPU's 112, 122, the memories 113, 123, and the IO processors 114, 124 based on the result of the inquiry to the fault monitoring section 130.

Figure 3:
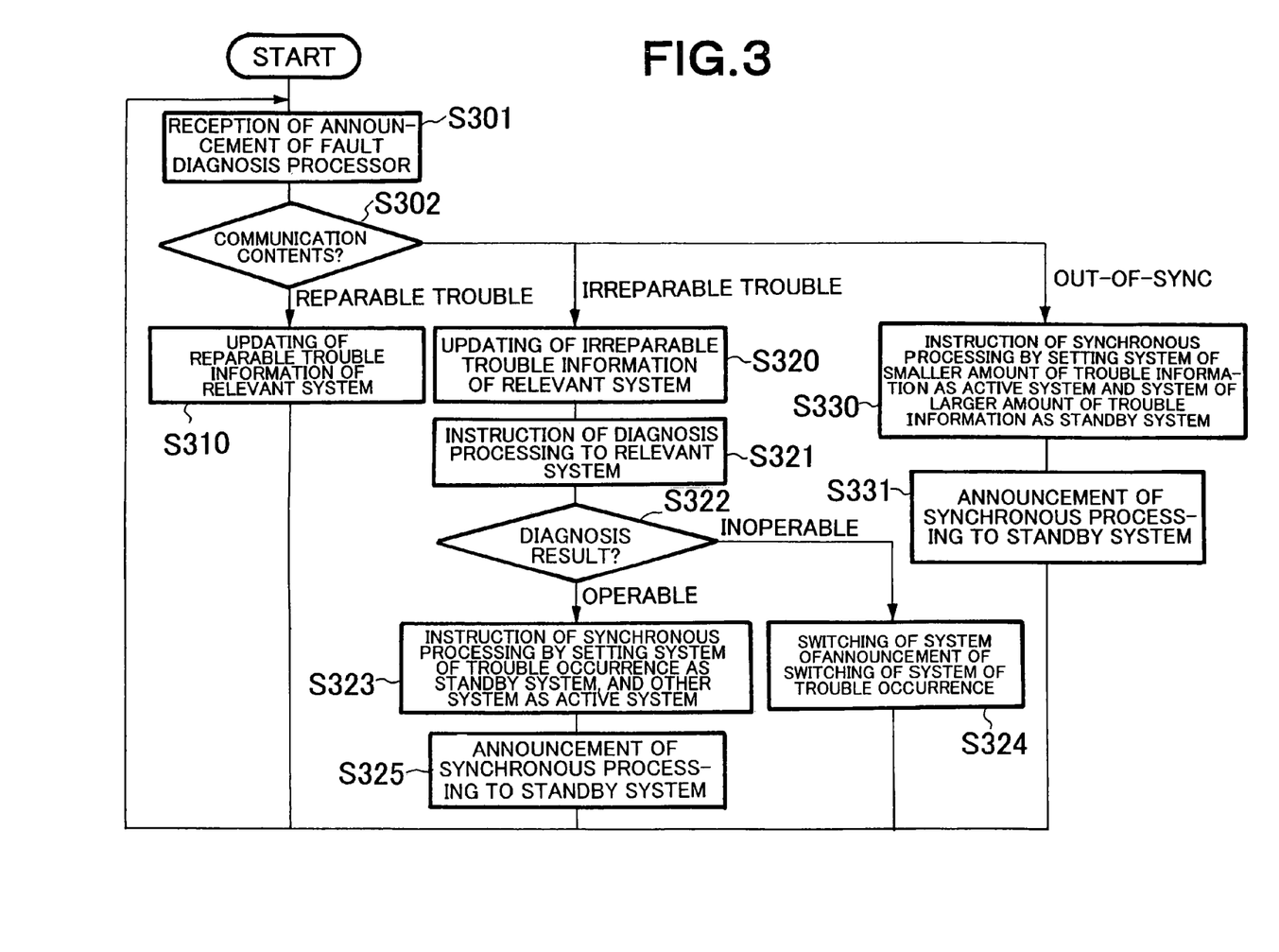
FIG. 3 is a flowchart illustrating an operation of a fault monitoring section.

Next, an outline of an operation of the fault monitoring section will be described by referring to a flowchart of FIG. 3. The fault monitoring section 130 receives the announcements of the reparable trouble, the irreparable trouble and the out-of-sync situation through the communication buses 141, 142 from the systems 110, 120 (step 301).

Upon reception of the reparable trouble, reparable trouble information 131 of the relevant system is updated (step 310). Upon reception of the irreparable trouble, irreparable trouble information 132 of the relevant system is updated (step 320), and a diagnosis of the system is instructed (step 321). When operability is determined, an instruction of synchronous processing (step 323) is announced again to the system (step 325). When inoperability is determined, processing of the relevant system is stopped to make a system switching announcement (step 324). Upon reception of the out-of-sync situation, pieces of trouble information of the systems 110 and 120 are compared with each other, and a synchronous processing instruction is made by setting the system 110 of a smaller amount of trouble information as an active system and the system 120 of a larger amount of trouble information as a standby system (step 330). A synchronous processing instruction of the standby system is announced through the communication bus 142 to the system 120 (step 331).

Next, an operation of the fault monitoring section corresponding to each trouble information will be described. First, description will be made of an operation when a reparable trouble occurs in one of the two systems operated in synchronization by referring to FIG. 4.

Figure 4:
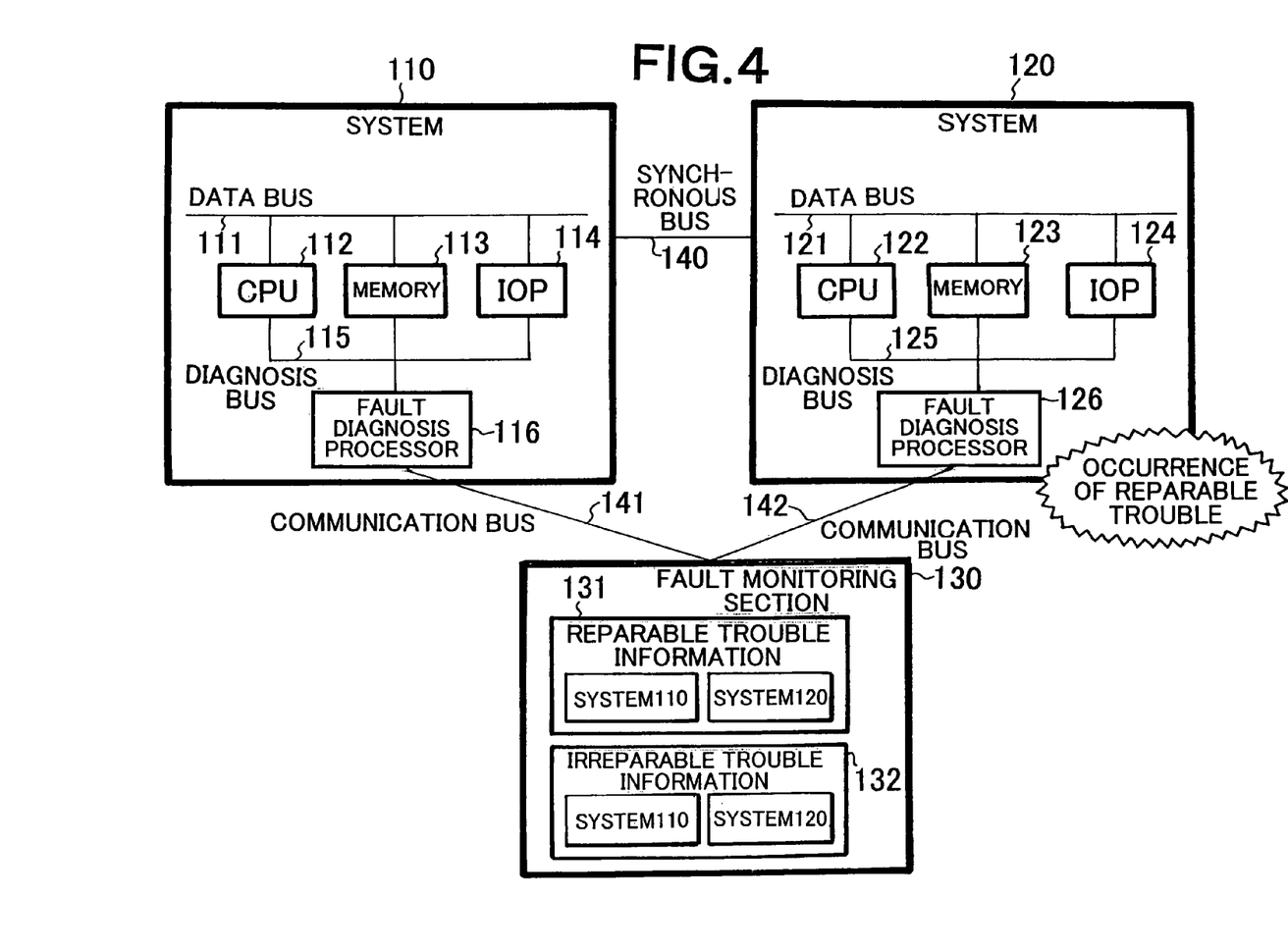
FIG. 4 is an explanatory diagram when a repairable trouble occurs in one system.

It is presumed that a trouble occurs in the IO processor 124 of the system 120 for one reason or another. The IO processor 124 determines contents of the trouble, determines that the trouble can be repaired, repairs the trouble to continue processing thereafter, and announces the occurrence of the reparable trouble through the diagnosis bus 125 to the fault diagnosis processor 126.

The fault diagnosis processor 126 receives the announcement of the reparable trouble from the IO processor 124 by the fault detection section 201. The fault information communication section 202 announces the occurrence of the reparable trouble through the communication bus 142 to the fault monitoring section 130.

The fault monitoring section 130 receives the announcement of the reparable trouble through the communication bus 142 from the system 120 (step 301). As the received announcement is the reparable trouble, the reparable trouble information 131 of the system 120 is updated (step S310) to finish the processing.

Figure 5:
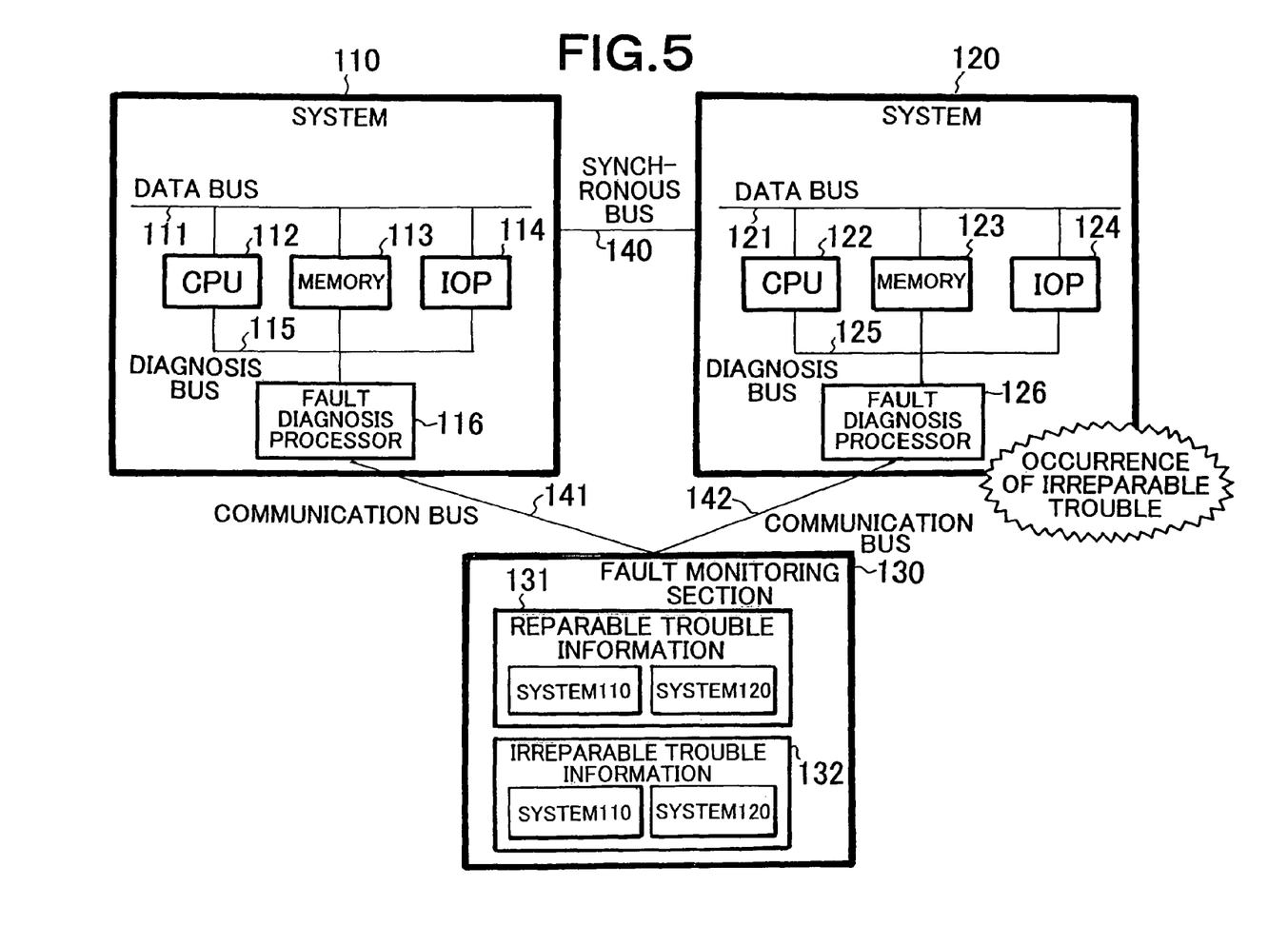
FIG. 5 is an explanatory diagram when an irreparable trouble occurs in one system.

Next, description will be made of an operation when an irreparable trouble occurs in one of the two systems operated in synchronization by referring to FIG. 5.

It is presumed that a trouble occurs in the IO processor 124 of the system 120 for one reason or another. The IO processor 124 determines contents of the trouble, determines that the trouble cannot be repaired, cancels processing thereafter, and announces the occurrence of the irreparable trouble through the diagnosis bus 125 to the fault diagnosis processor 126.

The fault diagnosis processor 126 receives the announcement of the irreparable trouble from the IO processor 124 by the fault detection section 201. The fault information communication section 202 announces the occurrence of the irreparable trouble and an inquiry about processing contents thereafter through the communication bus 142 to the fault monitoring section 130.

The fault monitoring section 130 receives the announcement of the irreparable trouble through the communication bus 142 from the system 120 (step 301). As the received announcement is the irreparable trouble, the irreparable trouble information 132 of the system 120 is updated (step S320) to make a diagnosis instruction to the system 120 (step 321).

The fault diagnosis processor 126 receives the diagnosis instruction through the communication bus 142 from the fault monitoring section 130 by the fault information communication section 202. The fault countermeasure section 203 transmits the received diagnosis instruction through the diagnosis bus 125 to the IO processor 124 which has announced the occurrence of the irreparable trouble.

The IO processor 124 diagnoses contents in accordance with the diagnosis instruction from the fault diagnosis processor 126, and announces its result through the diagnosis bus 125 to the fault diagnosis processor 126.

The fault diagnosis processor 126 announces the diagnosis result received from the IO processor 124 through the communication bus 142 to the fault monitoring section 130.

The fault monitoring section 130 determines the received diagnosis result (step 322). When operability is determined, a synchronous processing instruction (step 323) is announced again to the system 120 (step 325). The system 120 whose operability is determined by the fault monitoring section 130 determines receives the synchronous processing instruction, and starts synchronous processing with the system 110 to resume duplex running. When inoperability is determined, no announcement is made to the system 120, a stopped state of processing thereafter is maintained, and a switching request of the system 120 is displayed on a display or the like to be announced to a system manager (step 324).

Figure 6:
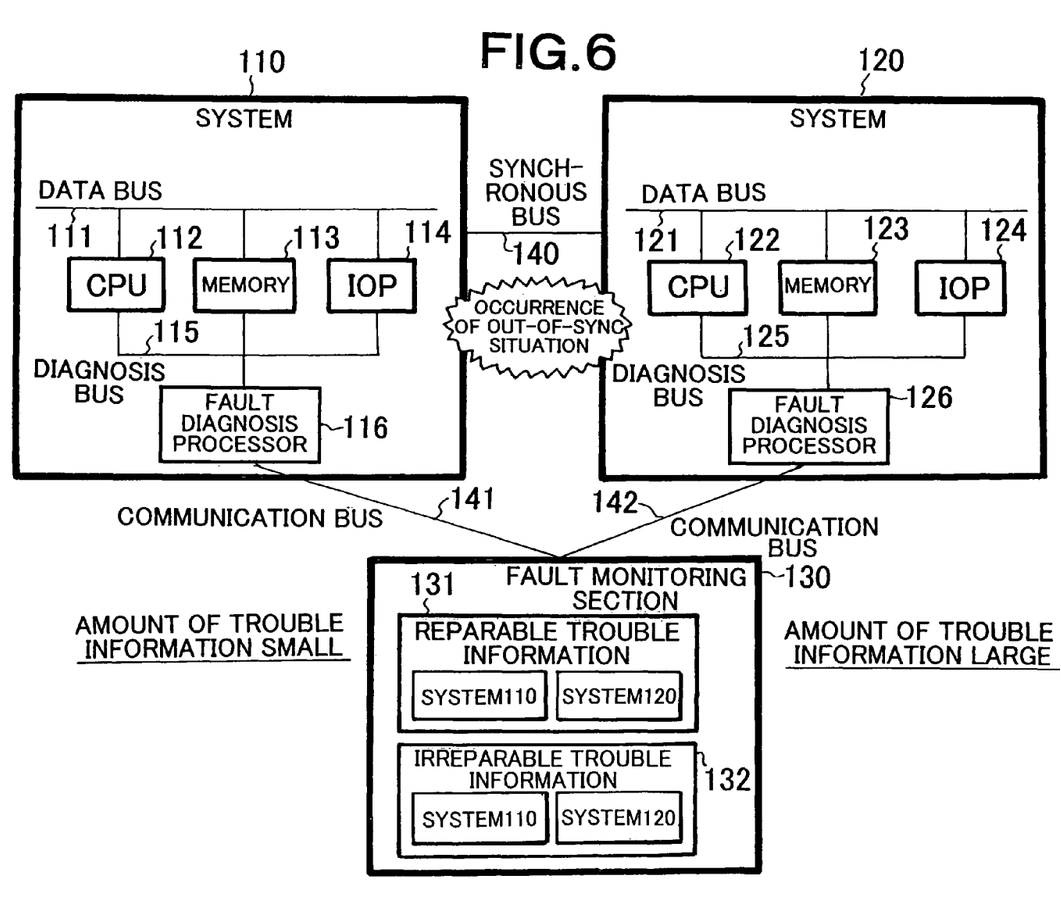
FIG. 6 is an explanatory diagram when an out-of-sync situation occurs between systems.

Next, description will be made of an operation when an out-of-sync situation occurs between the two systems operated in synchronization by referring to FIG. 6.

It is presumed that an out-of-sync situation occurs between the systems 110 and 120 for one reason or another. In the system 110, the CPU 112 monitors an operation situation of the system 120 through the synchronous bus 140, and detects an occurrence of an out-of-sync situation. Upon detection of the out-of-sync situation, the CPU 112 stops out-of-sync situation detection processing with the system 120, and announces the out-of-sync situation through the diagnosis bus 115 to the fault diagnosis processor 116.

The fault diagnosis processor 116 receives the announcement of the out-of-sync situation from the CPU 112 by the fault detection section 201. The fault information communication section 202 announces the occurrence of the out-of-sync situation and an inquiry about contents of processing thereafter through the communication bus 141 to the fault monitoring section 130.

In the system 120, the CPU 122 monitors an operation state of the system 110 through the synchronous bus 140, and detects the occurrence of the out-of-sync situation. Upon detection of the out-of-sync situation, the CPU 122 stops out-of-sync situation detection processing with the system 110, and announces the out-of-sync situation through the diagnosis bus 125 to the fault diagnosis processor 126.

The fault diagnosis processor 126 receives the announcement of the out-of-sync situation from the CPU 122 by the fault detection section 201. The fault information communication section 202 announces the occurrence of the out-of-sync situation and an inquiry about contents of processing thereafter through the communication bus 142 to the fault monitoring section 130.

The fault monitoring section 130 receives the announcement of the out-of-sync situation through the communication bus 141 from the system 110, and the announcement of the out-of-sync situation through the communication bus 142 from the system 120 (step 301).

As the received announcement is the out-of-sync situation (step 302), pieces of trouble information of the systems 110 and 120 are compared with each other, and a synchronous processing instruction is made by setting the system 110 of a smaller amount of trouble information as an active system and the system 120 of a larger amount of trouble information as a standby system (step 330). Synchronous processing of the standby system is announced through the communication bus 142 to the system 120 (step 331).

The fault diagnosis processor 126 receives the synchronous processing of the standby system through the communication bus 142 from the fault diagnosis section 130 by the fault information communication section 202. The fault diagnosis processor 126 that has received the synchronous processing of the standby system stops the processing of the system 120, and executes synchronous processing with the system 110 to resume the duplex running of the systems 110 and 120.

For example, the present invention can be applied to a duplex computer system applied to a data server which cannot stop processing for 24 hours or 365 days to manage user information such as Internet shopping.

What is claimed is:

1. A fault tolerant duplex computer system in which two systems perform duplex running in synchronization while monitoring mutual operation situations, comprising:
  a data processing section which causes each system to repair and announce a trouble generated in a process of transferring data or executing an arithmetic operation therein;
  a fault diagnosis processor which announces information of the trouble generated in the system and executes processing instructed to the system; and
  a fault monitoring section which classifies pieces of trouble information received from the systems to record them as reparable trouble information or irreparable trouble information, and instructs trouble repairing processing to the systems based on the information,
  wherein the fault monitoring section updates the reparable trouble information of a relevant system when a reparable trouble is received from each system; updates the irreparable trouble information of a relevant system to instruct a diagnosis of the system when an irreparable trouble is received; and compares the pieces of trouble information from the systems with each other when an out-of-sync situation is received, to instruct synchronous processing by setting the system including a smaller amount of the trouble information as an active system and the system including a larger amount of the trouble information as a standby system.

2. The system according to claim 1, wherein an instruction of synchronous processing is announced again to a relevant system when a result of the diagnosis in the case of receiving the irreparable trouble is determined to permit an operation.

3. The system according to claim 1, wherein processing of a relevant system is stopped to announce switching thereof when a result of the diagnosis in the case of receiving the irreparable trouble is determined to inhibit an operation.

4. A fault tolerant control method of a duplex computer system which includes a data processing section in each system to repair and announce a trouble generated in a process of transferring data or executing an arithmetic operation therein, and in which systems perform duplex running in synchronization while monitoring mutual operation situations, comprising:
  a fault diagnosis step of announcing information of the trouble generated in the system and executing processing instructed to the system; and
  a fault monitoring step of classifying pieces of trouble information received from the systems to record them as reparable trouble information or irreparable trouble information, and instructing trouble repairing processing to the systems based on the information,
  wherein in the fault monitoring step, the reparable trouble information of a relevant system is updated when a reparable trouble is received from each system, the irreparable trouble information of a relevant system is updated to instruct a diagnosis of the system when an irreparable trouble is received, and the pieces of trouble information from the systems are compared with each other, and synchronous processing is instructed by setting the system of a smaller amount of trouble information as an active system and the system of a larger amount of trouble information as a standby system when an out-of-sync situation is received.

5. The method according to claim 4, wherein an instruction of synchronous processing is announced again to a relevant system when a result of the diagnosis in the case of receiving the irreparable trouble is determined to permit an operation.

6. The method according to claim 4, wherein processing of a relevant system is stopped to announce switching thereof when a result of the diagnosis in the case of receiving the irreparable trouble is determined to inhibit an operation.

* * * * *